United States Patent [19]
Dewey et al.

[11] Patent Number: 5,067,864
[45] Date of Patent: Nov. 26, 1991

[54] SELF-DRILLING FASTENER FOR PLASTERBOARD WALL

[75] Inventors: George G. Dewey, Prospect Heights; Ralph D. Tenuta, Mount Prospect, both of Ill.

[73] Assignee: Illinois Tool Works Inc., Glenview, Ill.

[21] Appl. No.: 560,068

[22] Filed: Jul. 27, 1990

[51] Int. Cl.$^5$ .............................................. F16B 21/00
[52] U.S. Cl. ..................................... 411/344; 411/340
[58] Field of Search ................... 411/340, 341, 39, 37, 411/346, 345, 347, 342, 344, 550, 350

[56] References Cited

U.S. PATENT DOCUMENTS

| | | | |
|---|---|---|---|
| 3,385,156 | 5/1968 | Polos | 411/37 X |
| 3,927,597 | 12/1975 | Stults et al. | 411/341 |
| 4,285,264 | 8/1981 | Einhorn | 411/39 X |
| 4,407,462 | 9/1977 | Hurtig | 411/346 |
| 4,822,226 | 4/1989 | Kennedy | 411/346 X |

FOREIGN PATENT DOCUMENTS

| | | | |
|---|---|---|---|
| 115373 | 11/1900 | Fed. Rep. of Germany | 411/340 |
| 2249772 | 9/1973 | Fed. Rep. of Germany | 411/340 |
| 2549868 | 5/1976 | Fed. Rep. of Germany | 411/345 |
| 10046 | of 1894 | United Kingdom | 411/340 |

*Primary Examiner*—Rodney M. Lindsey
*Attorney, Agent, or Firm*—Schwartz & Weinrieb

[57] ABSTRACT

An improved fastener mountable within a plasterboard wall from one side of the wall and used with a screw comprises a fastener body and a toggle clamp pivotable between an insertion position and a toggle position. The fastener has a drilling tip adapted to drill a hole of sufficient diameter so as to accommodate the fastener, except for the fastener head which is adapted to coact with a driving tool. In a first embodiment, the drilling tip is an integral part of the fastener body and extends axially beyond the toggle clamp in its insertion position. In a second embodiment, the drilling tip is an integral part of the toggle clamp and extends axially beyond the fastener body in the insertion position of the toggle clamp. In each embodiment, the fastener is self-drilling.

20 Claims, 3 Drawing Sheets

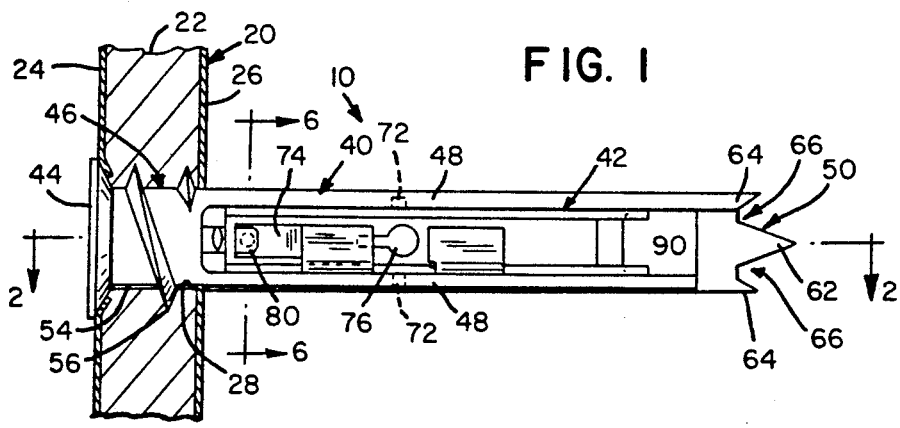
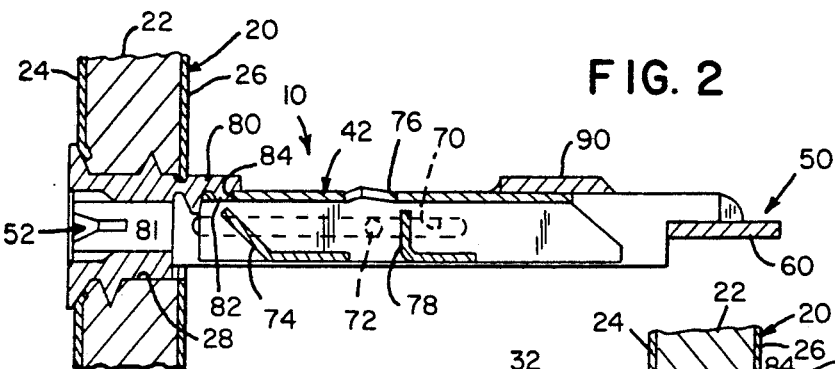
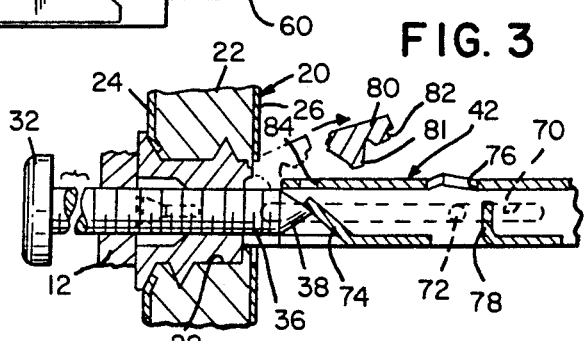
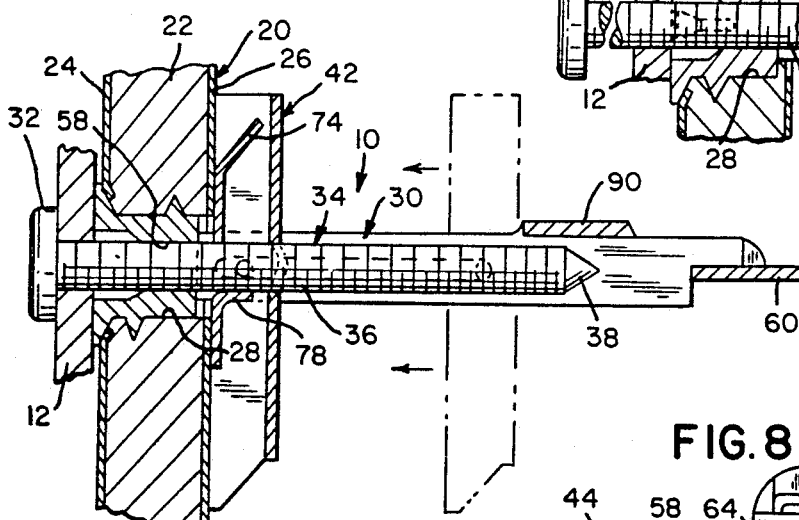
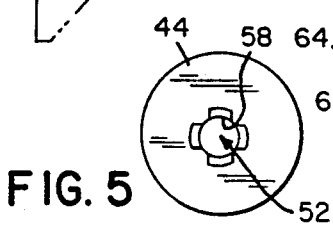
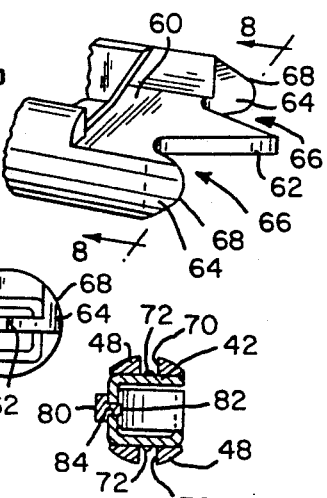

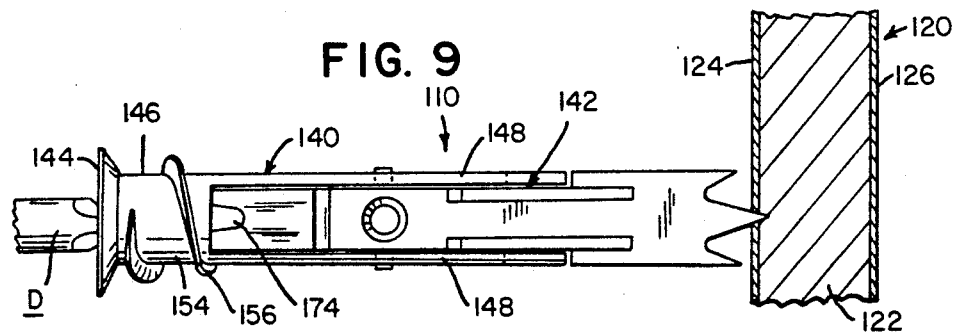
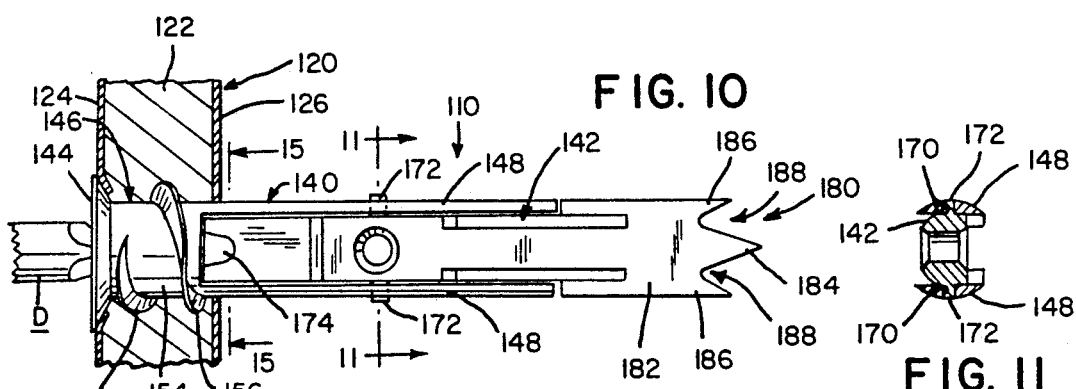
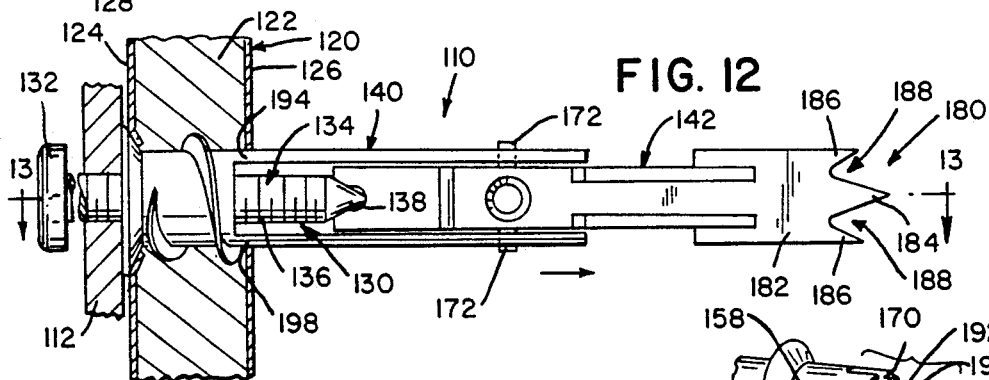
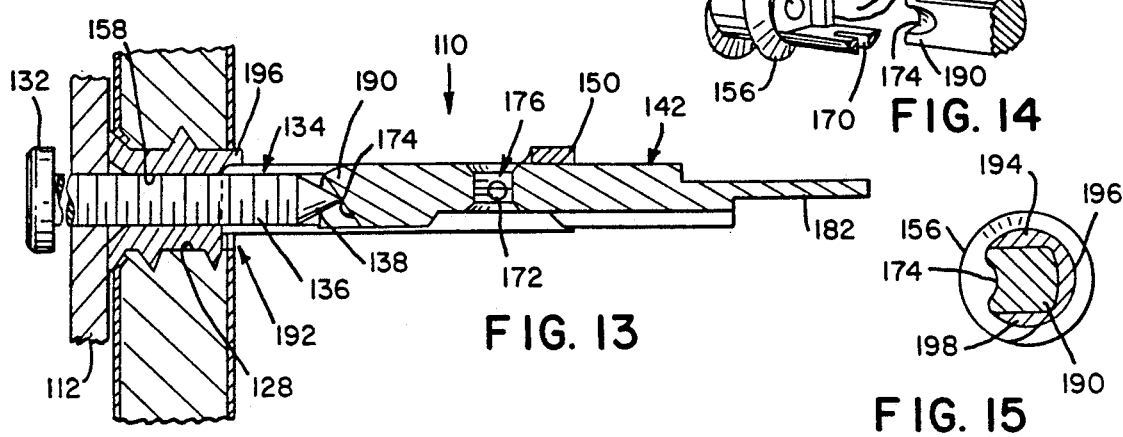
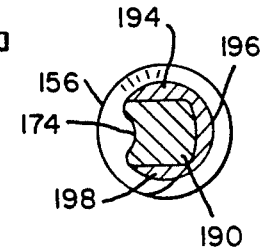

SELF-DRILLING FASTENER FOR PLASTERBOARD WALL

TECHNICAL FIELD OF THE INVENTION

This invention pertains to an improved fastener employing a toggle clamp and which is capable of being mounted upon a plasterboard or similar wall from one side of the wall. The fastener is self-drilling.

BACKGROUND OF THE INVENTION

A plasterboard wall comprises a core of friable material, such as, for example, gypsum plaster, between two paper layers. It is difficult to mount a heavy object to such a wall. The core can easily crumble. The paper layers can be easily torn.

Commonly, a blind fastener of a type employing a toggle clamp is used upon such mount a heavy object to a plasterboard or similar wall. A blind fastener is a fastener capable of being mounted upon a wall from one side of the wall.

It is highly desirable to provide a blind fastener of the type noted above that would be self-drilling.

SUMMARY OF THE INVENTION

This invention provides an improved fastener capable of being mounted upon a wall from one side of the wall, particularly but not exclusively a wall comprising a friable material, as exemplified by means of a plasterboard wall. The improved fastener is used with a screw having a head and an elongate shank with a threaded portion. The screw may be a conventional screw having a pointed tip, which is preferred, or a blunt tip.

Broadly, the improved fastener comprises a fastener body and a toggle clamp, which is pivotable between an insertion position and a toggle position. The improved fastener has a drilling tip, which is adapted to drill a hole of suitable diameter so as to accommodate the fastener, except for the head of the fastener body. The head of the fastener body has a relatively large cross section and in a preferred embodiment is adapted to coact with a driving tool, such as, for example, a screwdriver, when it is desired to use the drilling tip to drill such a hole.

The fastener body defines an axis. The fastener body has a shank, which is integral with the head of the fastener body, and at least one elongate arm integral with and extending axially from the shank of the fastener body. Preferably, the fastener body has a pair of elongate arms.

The shank of the fastener body has a relatively small cross-section and extends axially from the head of the fastener body. The head of the fastener body has a relatively large cross section. The fastener body has an axial bore extending through the head and shank of the fastener body so as to receive the screw.

The toggle clamp is mounted upon the fastener body so as to permit pivotal movement of the toggle clamp relative to the fastener body between an insertion position and a toggle position, and so as to permit axial movement of the toggle clamp relative to the fastener body. In the insertion position, the toggle clamp is aligned generally with the axis defined by means of the fastener body. In the toggle position, the toggle clamp is disposed generally at a right angle to such axis. The toggle clamp has a thread-accepting aperture, which is adapted to form a threaded connection with the threaded portion of the shank of the screw and to effect axial movement of the toggle clamp relative to the fastener body as the screw is driven into the thread-accepting aperture after the toggle clamp has been pivoted into the toggle position.

Preferably, each of the arms has an axially extending slot and the toggle clamp has a pair of oppositely extending pintles. Each pintle extends into a respective one of the slots so as to mount the toggle clamp pivotally upon the fastener body in such a manner that the toggle clamp is disposed between the arms when the toggle clamp is in the insertion position. The slots and pintles permit axial movement of the toggle clamp relative to the fastener body.

Preferably, the toggle clamp has a ramp. In the insertion position of the toggle clamp, the ramp is arranged so as to be axially engaged by means of the screw, as the shank of the screw is moved into the bore, so as to pivot the toggle clamp from the insertion position into the toggle position.

It is preferred that the fastener body includes means for restricting rotational movement of the fastener body relative to a wall when the fastener is mounted upon or within the wall. Preferably, such means comprises a threaded section formed upon the shank of the fastener body, near the head of the fastener body. The threaded section has a thread with a profile suitable for a wall comprising a friable material, as exemplified by means of a plasterboard wall.

In a first embodiment, the drilling tip is an integral part of the fastener body. Specifically, the drilling tip is integral with the elongate arms and extends axially beyond the toggle clamp in both positions of the toggle clamp.

In a second embodiment, the drilling tip is an integral part of the toggle clamp. Specifically, the drilling tip is integral with one of two opposite ends of the toggle clamp and extends axially beyond the arms of the fastener body in the insertion position of the toggle clamp.

Preferably, the drilling tip has a central cutter and two outer cutters with a cavity between each of the outer cutters and the central cutter. Preferably, the central cutter extends beyond the outer cutters, each of which defines a helical cutting edge.

In the first embodiment, the fastener body may include a deformable or frangible structure for preventing the toggle clamp from pivoting freely from the insertion position into the toggle position in a given direction of pivotal movement. Such structure is adapted to be deformed when engaged by means of the screw, as the shank of the screw is moved into the bore, so as to permit pivotal movement of the toggle clamp from the insertion position into the toggle position in the given direction. The deformable or frangible structure is adapted to prevent axial movement of the toggle clamp relative to the fastener body before the structure is deformed.

Along with the deformable or frangible structure noted above, the fastener body may also be formed so as to include additional structure for preventing pivotal movement of the toggle clamp from the insertion position into the toggle position in the opposite direction of pivotal movement. Preferably, the additional structure extends between the arms in axially spaced relation with respect to the shank of the fastener body.

In the second embodiment, if the toggle clamp has a ramp as noted above, the fastener body and the toggle clamp may then be made so as to have coacting means for providing a driving connection between the fastener body and the toggle clamp when the toggle clamp is at the insertion position. The driving connection enables the fastener to be rotatably and axially driven without imparting substantial stress to the pintles when the drilling tip is used to drill a hole within a wall. The driving connection is releasable when the ramp is engaged by means of the screw so as to permit pivotal movement of the toggle clamp from the insertion position into the toggle position.

Preferably, the coacting means include a noncircular circular plug formed upon the toggle clamp and wall portions defining a socket within the fastener body. The plug is formed upon the toggle clamp end opposite to the drilling tip. The socket conforms generally to the plug. The socket is adapted to receive the plug when the toggle clamp is at the insertion position. The socket is adapted to release the plug when the ramp is engaged by means of the screw so as to permit pivotal movement of the toggle clamp from the insertion position into the toggle position. Preferably, moreover, the ramp is defined by means of a groove formed within the plug.

BRIEF DESCRIPTION OF THE DRAWINGS

These and other objects, features, and advantages of this invention will become evident from the following description of two alternate embodiments of this invention, when considered with reference to the accompanying drawings, in which like reference characters designate like or corresponding parts throughout the several views, and wherein:

FIG. 1 is a sectional view taken through a fragmentary portion of a plasterboard wall so as to show a fastener according to a first embodiment of this invention as the same is mounted within the wall. The fastener is shown in side elevation as having been inserted through a hole drilled through the plasterboard wall by means of a drilling tip upon the fastener.

FIG. 2 is a sectional view taken along line 2—2 of FIG. 1, in a direction indicated by means of the arrows, so as to show the fastener in cross-section.

FIG. 3 is a view similar to that of FIG. 2 but taken to show a screw being used to mount a fixture upon the plasterboard wall and beginning to coact with the fastener. The fastener, the screw, and the fixture are shown fragmentarily.

FIG. 4 is a similar view showing the screw as having coacted with the fastener so as to pivot the toggle clamp into the toggle position and so as to draw the toggle clamp against the plasterboard wall.

FIG. 5 is an elevational view showing the fastener in end elevation without the screw and without the fixture.

FIG. 6 is a sectional view taken along line 6—6 of FIG. 1, in a direction indicated by means of the arrows, so as to show certain details of the fastener.

FIG. 7 is a slightly enlarged scale, is a fragmentary, perspective view of a drilling tip integrally formed upon the fastener.

FIG. 8, on the original scale, is an end view taken along line 8—8 of FIG. 7, in a direction indicated by means of arrows.

FIG. 9 is a sectional view taken through a fragmentary portion of a plasterboard wall so as to show a fastener according to a second embodiment of this invention. The fastener is shown in side elevation as about to drill a hole through the plasterboard wall by means of a drilling tip formed upon the fastener. A screwdriver is shown fragmentarily FIG. 10 is a view similar to FIG. 9 but taken so as to show the fastener as inserted through the hole drilled through the plasterboard wall by means of the drilling tip upon the fastener. The screwdriver is shown fragmentarily.

FIG. 11 is a sectional view taken along line 11—11 of FIG. 10, in a direction indicated by means of the arrows, so as to show certain details of the fastener.

FIG. 12 is a view similar to FIG. 10 but taken in a changed position so as to show a screw being used to mount a fixture upon the plasterboard wall and beginning to coact with the fastener. The screw and the fixture are shown fragmentarily.

FIG. 13 is a sectional view taken along line 13—13 of FIG. 12, in a direction indicated by means of the arrows, so as to show certain details of the fastener and the screw coacting with the fastener.

FIG. 14 is an exploded, fragmentary, perspective view showing certain details of a driving connection of the embodiment shown in FIGS. 9-13.

FIG. 15 is a sectional view taken along line 15—15 in FIG. 10, in a direction indicated by means of the arrows, so as to show certain details of the driving connection.

DETAILED DESCRIPTION OF PREFERRED EMBODIMENTS

Figure 16:
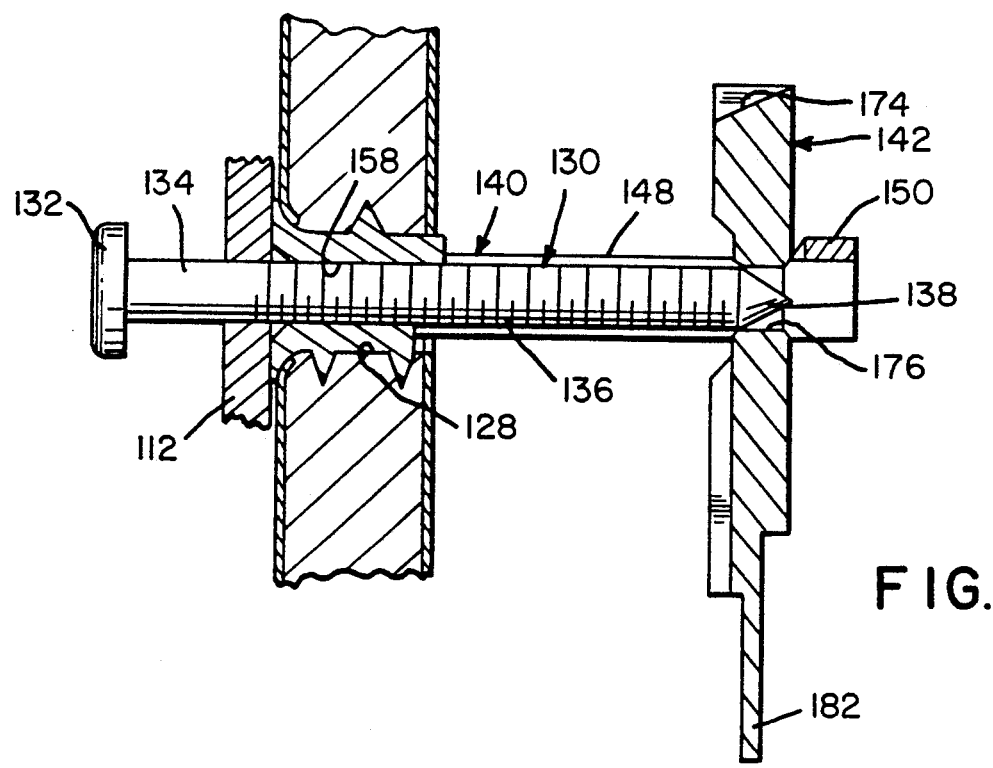
FIG. 16 is a sectional view similar to FIG. 13 but taken to show the fastener, the screw, and the fixture at a later stage in mounting the fixture upon the plasterboard wall. The complete screw is shown.

Two preferred embodiments of an improved fastener according to this invention are illustrated in the drawings. It should be understood that the illustrated embodiments are exemplary and that this invention is not limited to either embodiment.

Because an improved fastener according to this invention is self-drilling, such a fastener may be advantageously used with a plasterboard wall having a core of friable material, such as, for example, gypsum plaster, between two paper layers. Moreover, such a fastener may alternatively be used with a plaster wall or with a wall made predominantly of wood, presswood, or like material.

An improved fastener according to this invention is designed to coact with a conventional screw having a head designed to act with a conventional driving tool, such as, for example, a Phillips screwdriver, an elongated shank with a threaded portion, and a tip. The tip may be pointed or blunt. A pointed tip is preferred.

As shown in FIGS. 1 through 8, a fastener 10 constitutes a first of the preferred embodiments of this invention. The fastener 10 is shown as used to mount a fixture 12 upon a plasterboard wall 20.

The wall 20 has a core 22 of friable material, such as, for example, gypsum plaster, between two paper layers, namely an outer layer 24 and an inner layer 26. As shown, a hole 28 accommodating the fastener 10 is drilled, by means of the fastener 10, through the wall 20.

As explained below, the fastener 10 is used to drill such a hole.

The fastener 10 is shown as coacting with a conventional screw 30 having a Phillips head 32, an elongate shank 34 with a threaded portion 36, and a pointed tip 38. The Phillips head 32, which is designed to coact with a conventional Phillips screwdriver, retains the fixture 12 when the screw 30 is driven into the fastener 10.

Broadly, the fastener 10 comprises a fastener body 40 and a toggle clamp 42. Preferably, the fastener body 40 is die-cast from zinc and the toggle clamp 42 is stamped from sheet metal. Although zinc die-castings and sheet metal stampings are preferred, it is possible to mold the fastener body 40 and the toggle clamp 42 from a suitable plastic, such as, for example, reinforced polyolefin.

As die-cast or molded, the fastener body 40 defines an axis and has a head 44, a shank 46, a pair of elongate arms 48, and a drilling tip 50.

As compared to the shank 46, which has a relatively small cross section, the head has a relatively large cross section. Also, the head 44 is provided with a socket 52, by means of which the head 44 is adapted to coact with a conventional Phillips screwdriver.

The fastener body 40 includes means for restricting rotational movement of the fastener body 40 relative to a wall, such as, for example, the wall 20, when the fastener 10 is mounted upon the wall. Thus, the shank 46 has a threaded section 54 near the head 44. The threaded section 54 has a thread 56 with a profile suitable for a wall, such as, for example, the plasterboard wall 20, which comprises a friable material.

The elongate arms 48 are integral with the shank 46 and extend axially from the shank 46. The arms 48 fit within an imaginary, cylindrical envelope having a cross section approximately equal to the cross section of the threaded section 54, except for the thread 56.

The fastener body 40 has an unthreaded, axial bore 58, which extends through the head 44 and the shank 46, and which opens between the arms 48. The bore 58 is arranged to permit the shank 34 of the screw 30 to be axially moved into the bore 58. The shank 34 of the screw 30 may be axially pressed or rotatably and axially driven into the bore 58.

As an integral part of the fastener body 40, the drilling tip 50 is integral with the elongate arms 48, which are spanned by means of the drilling tip 50.

As shown in FIGS. 6 through 8, the drill tip 50 comprises a thin blade 60, which defines a center cutter 62, and two outer cutters 64 with a cavity 66 defined between each of the outer cutters 64 and the central cutter 62. The central cutter 62, which extends axially beyond the outer cutters 64, is wedge-shaped, as shown. Each outer cutter 64 defines a helical cutting edge 68.

When the drilling tip 50 is used to drill a hole, such as, for example, the hole 28, the central cutter 62 penetrates the outer, paper layer 24 and the core 22 before the outer cutters 64 contact such layer 24. Thereupon, the helical cutting edges 68 of the outer cutters 64 cut cleanly through the outer, paper layer 24 with minimal risk of tearing such layer 24.

The toggle clamp 42 is mounted upon the fastener body 40 so as to permit pivotal movement of the toggle clamp 42 relative to the fastener body 40 between an insertion position and a toggle position, and so as to permit axial movement of the toggle clamp 42 relative to the fastener body 40. In the insertion position, in which the toggle clamp 42 is shown in FIGS. 1, 2 and 3, the toggle clamp 42 is aligned generally with the elongate arms 48. In the toggle position, in which the toggle clamp 42 is shown in FIG. 4, the toggle clamp 42 is disposed generally at a right angle with respect to the elongate arms 48. As explained below, the screw 30 is used to pivot the toggle clamp 42 from the insertion position into the toggle position, after the fastener 10 has been inserted into the hole 28 with the toggle clamp 42 in the insertion position.

Each arm 48 has an axially extending slot 70. The toggle clamp 42 has a pair of oppositely extending pintles 72. Each pintle 72 extends into a respective one of the slots 70 so as to pivotably mount the toggle clamp 42 upon the fastener body 40 in such a manner that the toggle clamp 42 is disposed between the arms 48 when the toggle clamp 42 is in the insertion position. The slots 70 and pintles 72 permit axial movement of the toggle clamp 42 relative to the fastener body 40.

The toggle clamp 42 has a ramp 74, which is inclined, as shown, so as to define an angle of approximately about 45° relative to the axis defined by means of the fastener body 40 when the toggle clamp 42 is in the insertion position. Thus, in the insertion position of the toggle clamp 42, the ramp 74 is arranged so as to be axially engaged by means of the tip 38 of the screw 30 as the shank 34 of the screw 30 is moved into the bore 58 of the fastener body 40.

The toggle clamp 42 has a thread-accepting aperture 76, which is adapted to form a threaded connection with the threaded portion 36 of the shank 34 of the screw 30, when the screw 30 is driven into the thread-accepting aperture 76, after the toggle clamp 42 has been pivoted into the toggle position. As shown, the threaded portion 36 of the shank 34 is threaded into the toggle clamp 42. Alternatively, the thread-accepting aperture 76 may be complementarily threaded, so as to coact with the threaded portion 36.

The toggle clamp 42 has a flange 78 near the thread-accepting aperture 76. The flange 78 is shaped so as to help guide the threaded portion 36 of the shank 34 of the screw 30 into the thread-accepting aperture 76 when the toggle clamp 42 is disposed at the toggle position as shown in FIG. 4.

As die-cast or molded, the fastener body 40 has a deformable tongue 80, which serves as a means for preventing the toggle clamp 42 from pivoting freely from the insertion position into the toggle position in a given direction of pivotal movement. In FIGS. 2, 3, and 4, the given direction of pivotal movement is clockwise. The tongue 80 includes a lip 81 adapted to be engaged by means of the tip 38 of the screw 30, as the shank 34 of the screw 30 is moved into the bore 58, so as to break or be deflected away, thereby permitting pivotal movement of the toggle clamp 42 from the insertion position into the toggle position in the given direction. It is not necessary, however, for the tongue 80 to completely or fully break away so as to permit such movement.

The tongue 80 is formed with an internally extending tab 82. The tab 82 fits into an aperture 84 defined within the toggle clamp 42 and coacts with the aperture 84 so as to prevent axial movement of the toggle clamp 42 relative to the fastener body 40 before the tongue 80 is deformed.

A connecting bridge 90 is formed integrally with the arms 48, so as to extend between the arms 48, in axially spaced relation with respect to the shank 46. The bridge 90 constitutes means for preventing pivotal movement of the toggle clamp 42 from the insertion position into the toggle position in a direction of pivotal movement opposite to that desired. In FIGS. 2, 3, and 4, the opposite direction of pivotal movement is counterclockwise.

As shown in FIGS. 9 through 17, a fastener 110 constitutes a second one of the preferred embodiments of this invention. The fastener 110 is a blind fastener, which is capable of mounting a fixture 112 upon a plasterboard wall 120.

The plasterboard wall 120 is similar to the wall 20 and comprises a core 122 of friable material, such as, for example, gypsum plaster, between two paper layers, namely an outer layer 124 and an inner layer 126. As shown in FIGS. 10, 12, and 13, a hole 128 accommodating the fastener 110 is drilled through the wall 120. As explained below, the fastener 110 is used to drill such a hole.

The fastener 110 is shown as coacting with a conventional screw 130 similar to the screw 30 described above. Thus, the screw 130 has a Phillips head 132, an elongate shank 134 with a threaded portion 136, and a pointed tip 138. The head 132 retains the fixture 112, as shown, when the screw 130 is driven into the fastener 110.

Broadly, the fastener 110 comprises a fastener body 140 and a toggle clamp 142. Preferably, the fastener body 140 and the toggle clamp 142 are molded from a suitable plastic, such as, for example, reinforced polyolefin. Although plastic moldings are preferred, it is possible to die-cast the fastener body 140 from zinc and to stamp the toggle clamp 142 from sheet metal.

As molded or die-cast, the fastener body 140 defines an axis and has a head 144, a shank 146, a pair of elongate arms 148, and a connecting bridge 150.

As compared to the shank 146, which has a relatively small cross section, the head 144 has a relatively large cross section. Also, the head 144 is provided with a socket (not shown) which is similar to the socket 52 of the head 44 of the screw 30, and by means of which the head 144 is adapted to coact with a conventional Phillips screwdriver, such as, for example, the Phillips screwdriver D shown fragmentarily in FIGS. 9 and 10.

The fastener body 140 includes means for restricting rotational movement of the fastener body 140 relative to a wall, such as, for example, the wall 120, when the fastener 110 is mounted within the wall. Thus, the shank 146 has a threaded section 154 near the head 144. The threaded section 154 has a thread 156 with a profile suitable for a wall such as, for example, the plasterboard wall 120, which comprises a friable material.

The elongate arms 148 are integral with the shank 146 and extend axially from the shank 146. The arms 148 fit within an imaginary, cylindrical envelope having a cross section which is approximately equal to the cross section of the threaded section 154, except for the thread 156. The bridge 150, which is integral with the arms 148, connects the arms 148 at their distal ends, in axially spaced relation with respect to the threaded section 154.

The fastener body 140 has an unthreaded, axial bore 158, which extends through the head 144 and the shank 146, and which opens between the arms 148. The bore 158 is arranged to permit the shank 134 of the screw 130 to be axially moved into the bore 158. The shank 134 may be axially pressed or rotatably and axially driven into the bore 158.

Figure 17:
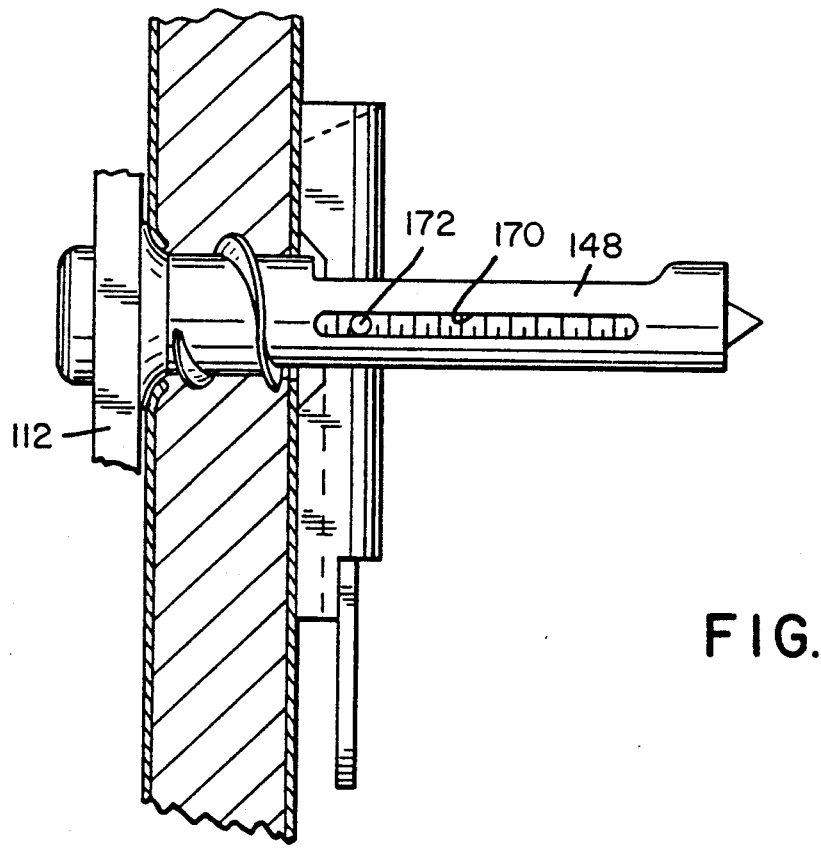
FIG. 17 is a view similar to FIGS. 13 and 16 but taken so as to show the fastener in side elevation and the screw as having coacted with the fastener so as to pivot the toggle clamp into the toggle position, and so as upon draw the toggle clamp against the plasterboard wall, at a final stage in mounting the fixture to the plasterboard wall.

The toggle clamp 142 is mounted upon the fastener body 140 so as to permit pivotal movement of the toggle clamp 142 relative to the fastener body 140 between an insertion position and a toggle position, and so as to permit axial movement of the toggle clamp 142 relative to the fastener body 140. In the insertion position, in which the toggle clamp 142 is shown in FIGS. 9 through 12, the toggle clamp 142 is generally aligned with respect to the elongate arms 148. In the toggle position, in which the toggle clamp 142 is shown in FIGS. 16 and 17, the toggle clamp 142 is disposed generally at a right angle with respect to the elongate arms 148. As explained below, the screw 130 is used to pivot the toggle clamp 142 from the insertion position into the toggle position, after the fastener 110 has been inserted into the hole 128 with the toggle clamp 142 in the insertion position.

Each arm 148 has an axially extending slot 170. The toggle clamp 142 has a pair of oppositely extending pintles 172. Each pintle 172 extends into a respective one of the slots 170 so as to pivotably mount the toggle clamp 142 upon to the fastener body 140 in such a manner that the toggle clamp 142 is disposed between the arms 148 when the toggle clamp 142 is in the insertion position. The slots 170 and pintles 172 permit axial movement of the toggle clamp 142 relative to the fastener body 140.

The toggle clamp 142 has a ramp 174. In the insertion position of the toggle clamp 142, the ramp 174 is arranged so as to be axially engaged by means of the tip 138 of the screw 130 as the shank 134 of the screw 130 is moved into the bore 158 of the fastener body 140.

The toggle clamp 142 has a thread-accepting aperture 176, which is adapted to form a threaded connection with the threaded portion 136 of the shank 134 of the screw 130, when the screw 130 is driven into the thread-accepting aperture 176, after the toggle clamp 142 has been pivoted into the toggle position. As shown, the thread-accepting aperture 176 is threaded complementarily, so as to coact with the threaded portion 136.

As fabricated, the toggle clamp 142 is formed upon one of its ends with an integral drilling tip 180.

As shown, the drilling tip 180 comprises a thin blade 182 defining three wedge-shaped cutters, namely a central cutter 184 and two outer cutters 186 with a cavity 188 defined between each of the outer cutters 186 and the central cutter 184. The central cutter 184 extends axially beyond the outer cutters 186.

When the drilling tip 180 is used to drill a hole, such as, for example, the hole 128, the central cutter 184 penetrates the outer paper layer 124, as shown in FIG. 9, before the outer cutters 186 contact such layer 124. Thereupon, the outer cutters 186 cut through the outer paper layer 124.

In an alternative arrangement (not shown) the toggle clamp 142 may be integrally formed with a drilling tip similar to the drilling tip 50 of the first embodiment described above. Such a drilling tip may be more effective, as it tends to cut clearly through an outer, paper layer of a plasterboard wall with minimal risk of tearing such layer.

The fastener body 140 and the toggle clamp 142 have a driving connection defined therebetween when the toggle clamp 142 is in the insertion position. The driving connection enables the fastener 110 to be rotatably and axially driven without imparting substantial stress to the pintles 172 when the drilling tip 180 of the toggle clamp 142 is used to drill a hole, such as, for example, the hole 128, within a wall, such as, for example, the wall 120. The driving connection is releasable when the ramp 174 is engaged by means of the screw 130 so as to permit pivotal movement of the toggle clamp 142 from the insertion position into the toggle position.

The driving connection is defined by means of a non-circular plug 190 formed upon one end of the toggle clamp 142, namely the end opposite to the drilling tip 180, and a socket 192 formed within the fastener body 140. The plug 190 and the socket 192 have non-circular cross-section. The socket 192 conforms generally to the plug 90. As shown, the plug 190 is substantially square in cross-section and is formed with the ramp 174, which is defined by means of a groove formed within the plug 190. As shown, the socket 192 is substantially square in cross-section and with one open side and is defined by means of wall portions 194, 196, 198, which enclose the plug 190 on three sides when the toggle clamp 142 in the insertion position is pressed axially against the shank 146 of the fastener body 140.

Thus, the socket 192 is adapted to receive the plug 190 when the toggle clamp 142 is in the insertion position. The wall portion 196 bridges the wall portions 194, 198, and extends axially for a short distance, as shown. Thus, the socket 192 is adapted to release the plug 190 when the toggle clamp 142 is displaced axially by means of a greater distance, after the ramp 174 has been engaged by means of the screw 130, so as to release the driving connection between the fastener body 140 and the toggle clamp 142.

Various modification may be made without departing from the scope and spirit of this invention. It is therefore to be understood that within the scope of the appended claims, the present invention may be practiced otherwise than as specifically described herein.

We claim:

1. A fastener capable of being drilled into a wall, said fastener being used with a screw having a head and an elongate shank with a threaded portion, and comprising:
   a fastener body defining a longitudinal axis and having a head, a shank integral with and extending axially from said head of said fastener body, and at least one elongate arm integral with and extending axially from said shank of said fastener body, said fastener body having an axial bore which extends through said head and said shank of said fastener body, and which is arranged so as to permit said shank of said screw to be axially moved within said bore; and
   a toggle clamp mounted upon said fastener body so as to permit pivotal movement of said toggle clamp relative to said fastener body between an insertion position wherein said toggle clamp is substantially aligned with said axis of said fastener body, and a toggle position wherein said toggle clamp is disposed at substantially a right angle with respect to said axis of said fastener body, and so as to permit axial movement of said toggle clamp relative to said fastener body, said toggle clamp having a thread-accepting aperture which is adapted to form a threaded connection with said threaded portion of said shank of said screw and to effect said axial movement of said toggle clamp relative to said fastener body as said screw is threadedly engaged within said thread-accepting aperture of said toggle clamp after said toggle clamp has been pivoted into said toggle position;
   wherein said fastener has a drilling tip for drilling a hole of suitable diameter within said wall so as to accommodate said fastener, except for said head of said fastener body, when said toggle clamp is disposed at said insertion position, a threaded portion defined upon an exterior peripheral portion of said shank of said fastener body for threadedly engaging said wall in order to fixedly mount said fastener within said wall, and socket means defined within said shank of said fastener body within the vicinity of said head of said fastener body for receiving a tool for imparting rotation to said fastener whereby said drilling tip can drill said hole within said wall in a self-drilling manner and said threaded portion of said shank of said fastener body can threadedly engage said wall in a self-drilling manner in order to respectively insert said toggle clamp through said wall and to fixedly mount said fastener within said wall.

2. A fastener capable of being drilled into a wall, said fastener being used with a screw having a head and an elongate shank with a threaded portion, and comprising:
   a fastener body defining a longitudinal axis and having a head, a shank integral with and extending axially from said head of said fastener body, and a pair of elongate arms integral with and extending axially from said shank of said fastener body, said fastener body having an axial bore which extends through said head and said shank of said fastener body, and which is arranged so as toe permit said shank of said screw to be axially moved within said bore; and
   a toggle clamp mounted upon said fastener body so as to permit pivotal movement of said toggle clamp relative to said fastener body between an insertion position wherein said toggle clamp is substantially aligned with said axis of said fastener body, and a toggle position wherein said toggle clamp is disposed at a substantially right angle with respect to said axis of said fastener body, and so as to permit axial movement of said toggle clamp relative to said fastener body, said toggle clamp having a thread-accepting aperture which is adapted to form a threaded connection with said threaded portion of said shank of said screw and to effect said axial movement of said toggle clamp relative to said fastener body as said screw is threadedly engaged with said thread-accepting aperture of said toggle clamp after said toggle clamp has been pivoted to said toggle position;
   wherein said fastener has a drilling tip for drilling a hole of suitable diameter within said wall so as to accommodate said fastener, except for said head of said fastener body, when said toggle clamp is disposed at said insertion position, a threaded portion defined upon an exterior peripheral portion of said shank of said fastener body for threadedly engaging said wall, and socket means defined within said shank of said fastener body within the vicinity of said head of said fastener body for receiving a tool for imparting rotation to said fastener whereby said drilling tip can drill said hole within said wall in a self-drilling manner and said threaded portion of said shank of said fastener body can threadedly engage said wall in a self-drilling manner in order to respectively insert said toggle clamp through said wall and to fixedly mount said fastener within said wall.

3. The fastener of claim 2 wherein the drilling tip is integral with the elongate arms and extends axially beyond the toggle clamp in both positions of the toggle clamp.

4. The fastener of claim 3 wherein each of the arms has an elongate slot and the toggle clamp has a pair of oppositely extending pintles, each of which extends into a respective one of the slots so as to mount the toggle clamp pivotally to the fastener body in such manner that the toggle clamp when in the insertion position is disposed between the arms, and so as to permit axial movement of the toggle clamp relative to the fastener body.

5. The fastener of claim 3 wherein the toggle clamp has a ramp, which in the insertion position of the toggle clamp is arranged to be axially engaged by the screw, as the shank of the screw is inserted into the bore, so as to pivot the toggle clamp from the insertion position into the toggle position.

6. The fastener of claim 5 wherein the fastener body includes deformable means for preventing the toggle clamp from pivoting freely from the insertion position into the toggle position in a given direction of pivotal movement, said means being adapted to be deformed, as the shank of the screw is moved into the bore, so as to permit pivotal movement of the toggle clamp from the insertion position into the toggle position in the given direction, and wherein the fastener body includes additional means for preventing pivotal movement of the toggle clamp from the insertion position into the toggle position in an opposite direction of pivotal movement.

7. The fastener of claim 6 wherein the deformable means includes a lip engageable by the screw, as the shank of the screw is moved into the bore, so as to bend away from the fastener body.

8. The fastener of claim 6 wherein the deformable means extends from the shank of the fastener body and the additional means extends between the arms in axially spaced relation to the shank of the fastener body.

9. The fastener of claim 6 wherein the deformable means includes a tab coacting with the toggle clamp so as to prevent axial movement of the toggle clamp relative to the fastener body before the deformable means is deformed.

10. The fastener of claim 2 wherein the threaded portion comprises means for restricting rotational movement of the fastener body relative to a wall when the fastener is mounted to the wall.

11. The fastener of claim 10 wherein the threaded portion has a thread with a profile suitable for a wall comprising a friable material.

12. The fastener of claim 3 wherein the drilling tip has a central cutter and two outer cutters with a cavity between each of the outer cutters and the central cutter, the center cutter extending axially beyond the outer cutters, each of which defines a generally helical cutting edge.

13. The fastener of claim 2 wherein the toggle clamp has two opposite ends, the drilling tip being integral with one of the opposite ends of the toggle clamp and extending axially beyond the arms of the fastener body in the insertion position of the toggle clamp.

14. The fastener of claim 13 wherein each of the arms has an axially extending slot and the toggle clamp has a pair of oppositely extending pintles, each of which extends into a respective one of the slots so as to mount the clamp pivotally to the fastener body, between the arms, and so as to permit axial movement of the toggle clamp relative to the fastener body.

15. The fastener of claim 13 wherein the toggle clamp has a ramp, which in the insertion position of the toggle clamp is arranged to be axially engaged by the screw, as the shank of the screw is moved into the bore, so as to pivot the toggle clamp from the insertion position into the toggle position.

16. The fastener of claim 15 wherein the fastener body and the toggle clamp have coacting means for providing a driving connection between the fastener body and the toggle clamp, when the toggle clamp is in the insertion position, the driving connection enabling the fastener to be rotatably and axially driven without imparting substantial stress to the pintles when the drilling tip is used to drill a hole in a wall, the driving connection being releasable when the ramp is engaged by the screw so as to permit pivotal movement of the toggle clamp from the insertion position into the toggle position.

17. The fastener of claim 16 wherein the coacting means for providing the driving connection include a noncircular plug formed on the toggle clamp and wall portions defining a socket in the fastener body, the plug being formed on the toggle clamp end opposite to the drilling tip, the socket conforming generally to the plug and being adapted to receive the plug when the toggle clamp is in the insertion position and to release the plug when the ramp is engaged by the screw so as to permit pivotal movement of the toggle clamp from the insertion position into the toggle position.

18. The fastener of claim 17 wherein the ramp is defined by a groove formed in the plug.

19. The fastener as set forth in claim 13, wherein:
said drilling tip comprises a central cutter and two outer cutters with a cavity defined between each of said outer cutters and said central cutter, said central cutter extending axially beyond said outer cutters, each of said outer cutters defining a substantially helical cutting edge.

20. The fastener as set forth in claim 2, further comprising:
guide means fixedly mounted upon said toggle clamp for guiding said threaded shank portion of said screw into said thread-accepting aperture of said toggle clamp.

* * * * *